United States Patent [19]
Ootsuka

[11] Patent Number: 5,793,730
[45] Date of Patent: Aug. 11, 1998

[54] CLUTCH GEAR AND DISK REPRODUCING APPARATUS

[75] Inventor: Makoto Ootsuka, Yokohama, Japan

[73] Assignee: Kabushiki Kaisha Toshiba, Kanagawa-ken, Japan

[21] Appl. No.: 865,195

[22] Filed: May 29, 1997

Related U.S. Application Data

[63] Continuation of Ser. No. 538,941, Oct. 4, 1995, abandoned.

[30] Foreign Application Priority Data

Oct. 4, 1994 [JP] Japan .................. 6-240436

[51] Int. Cl.⁶ .................................................. G11B 33/02
[52] U.S. Cl. ............................................................ 369/77.1
[58] Field of Search ............................ 369/77.1, 77.2, 369/75.1, 75.2, 178, 191, 192; 360/99.06, 99.07, 96.5, 99.02

[56] References Cited

U.S. PATENT DOCUMENTS

| | | |
|---|---|---|
| 5,251,195 | 10/1993 | Kawakami et al. ........... 369/77.1 |
| 5,327,412 | 7/1994 | Lee ................................ 369/178 |
| 5,434,839 | 7/1995 | Choi .............................. 369/77.1 |
| 5,467,333 | 11/1995 | Ji ................................... 369/75.2 |
| 5,473,592 | 12/1995 | Choi .............................. 369/75.2 |

*Primary Examiner*—Stuart S. Levy
*Assistant Examiner*—Allen Cao
*Attorney, Agent, or Firm*—Cushman Darby & Cushman IP Group of Pillsbury Madison & Sutro LLP

[57] ABSTRACT

A clutch gear for transmitting the motion of one motor to two mechanisms that comprises a first gear linked to a first mechanism, a second gear linked to a second mechanism, the second gear facing the first gear, the motion of the motor being transmitted to the second gear and then the first gear, and a first fitting member and a second fitting member formed on the first gear and the second gear in such a manner that the first fitting member and the second fitting member face the second gear and the first gear. The first fitting member and the second fitting member are adapted for coupling the first gear the second gear and to simultaneously rotate the first gear and the second gear when the rotating load of the first gear is less than a predetermined value, and wherein at least one of the first fitting member and the second fitting member are elastically deformed so that the first gear and the second gear are released when the rotating load of the first gear exceeds the predetermined value.

8 Claims, 19 Drawing Sheets

FIG. 7
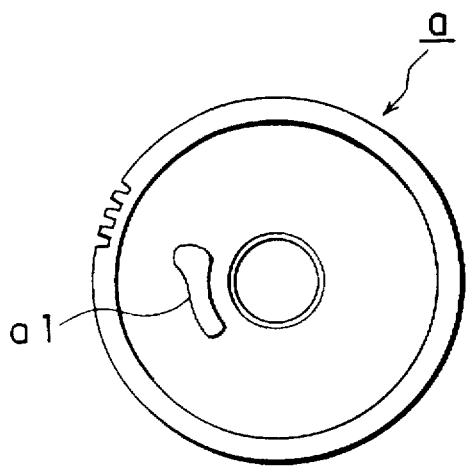
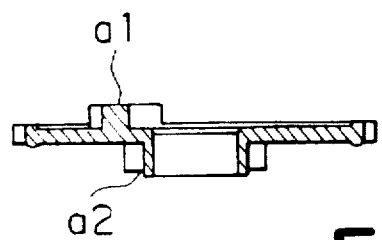
FIG. 8
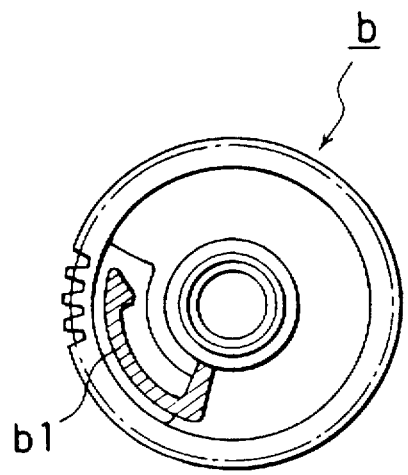
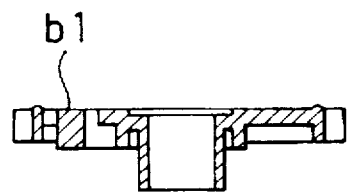
FIG. 9
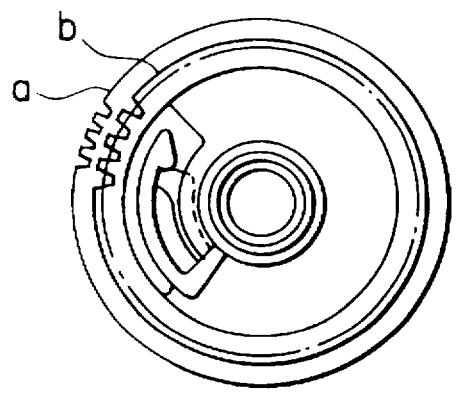
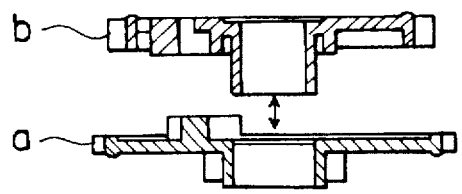

FIG. 13
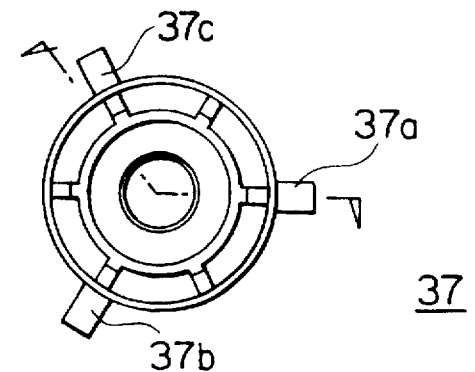
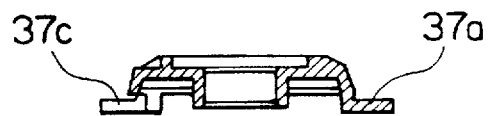
FIG. 14
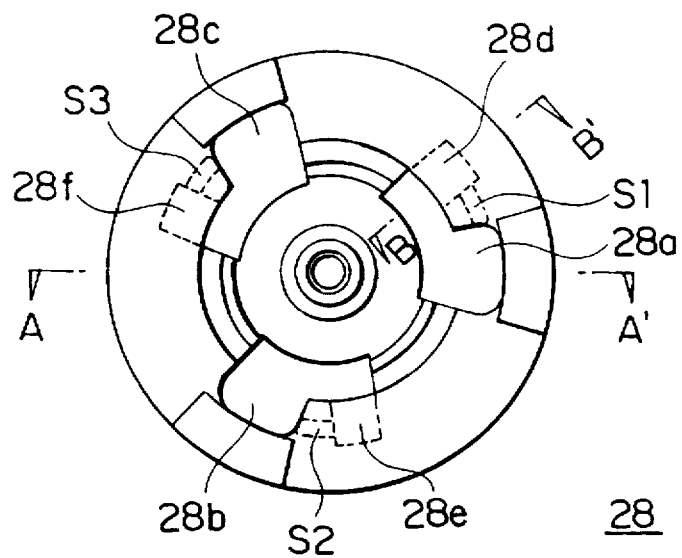
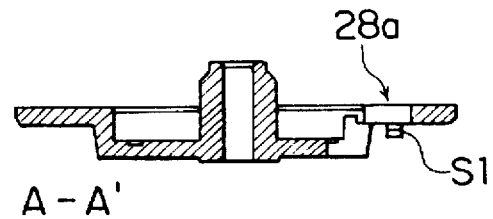
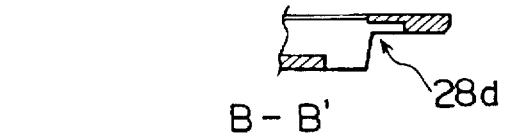

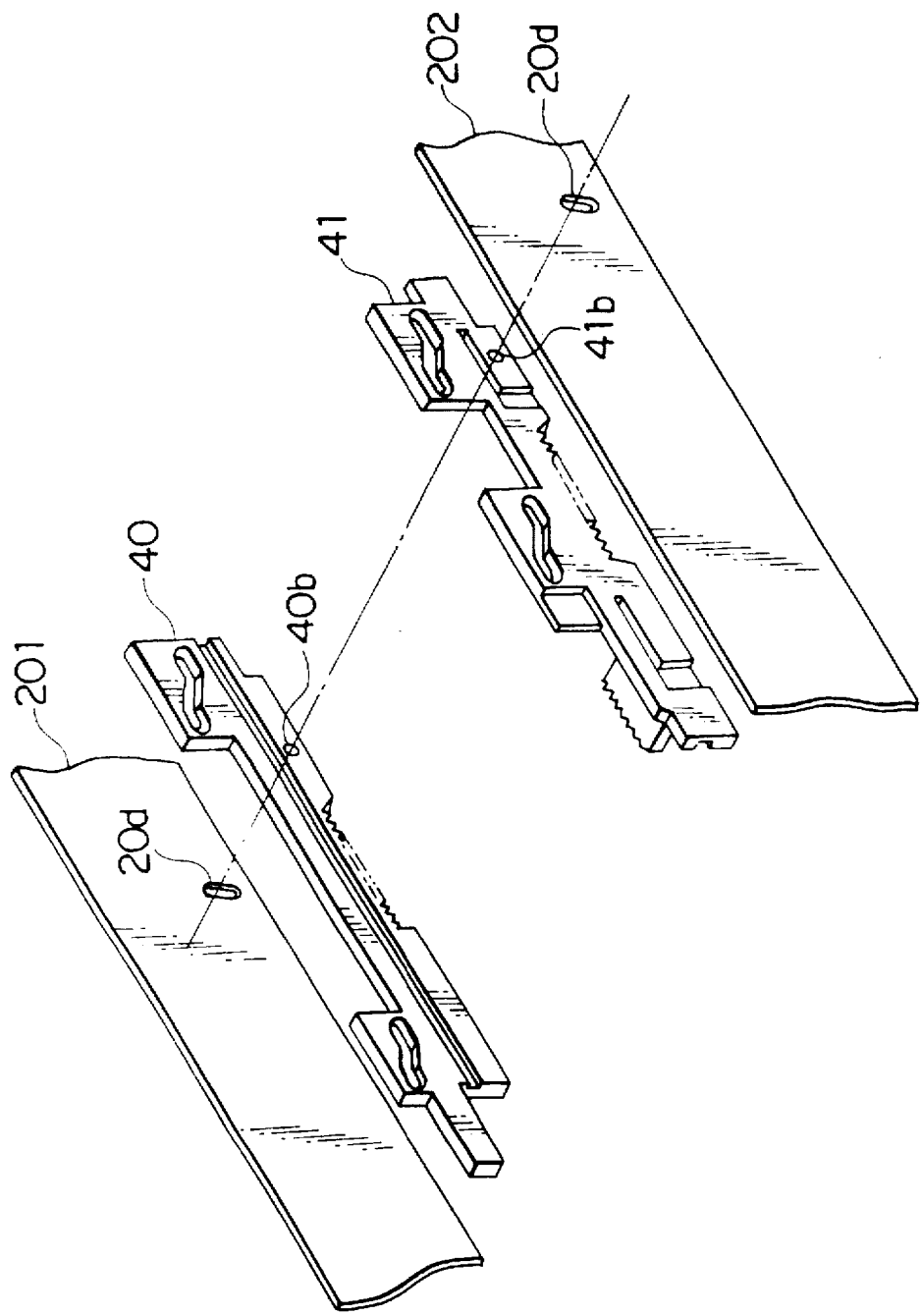

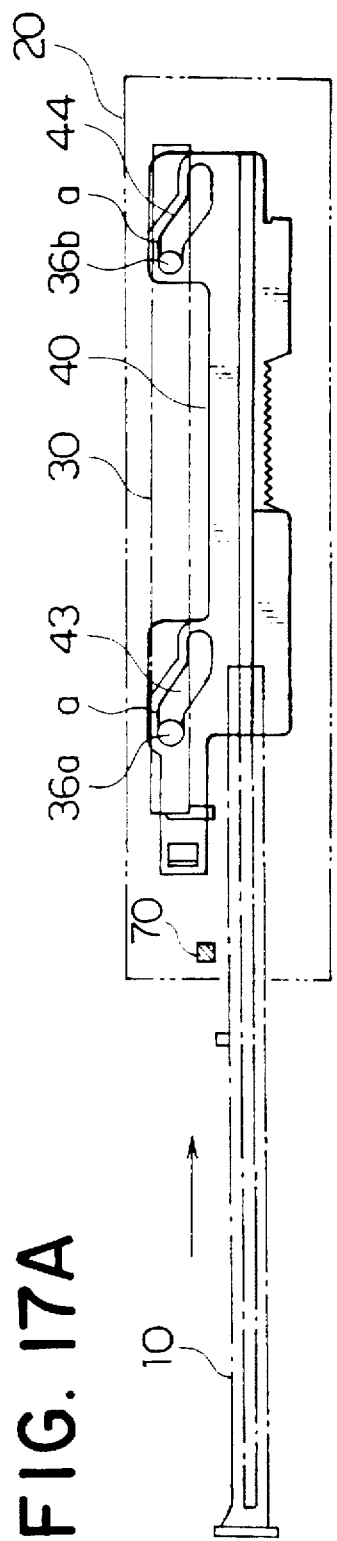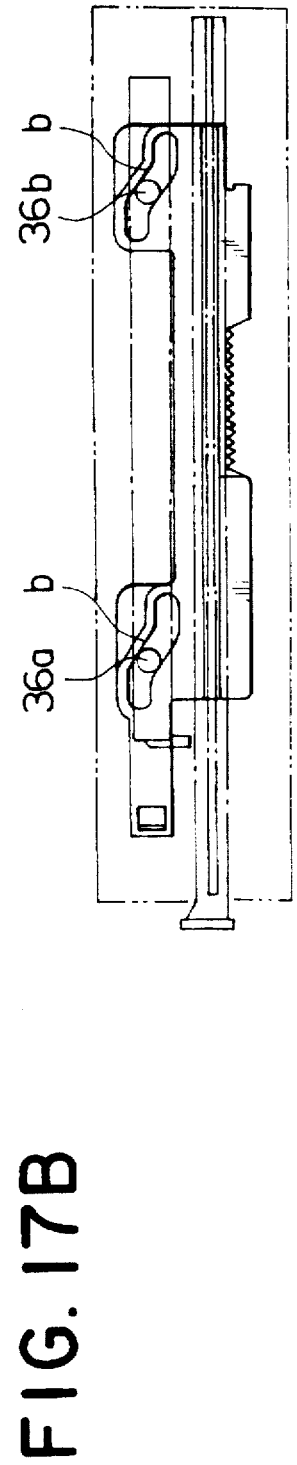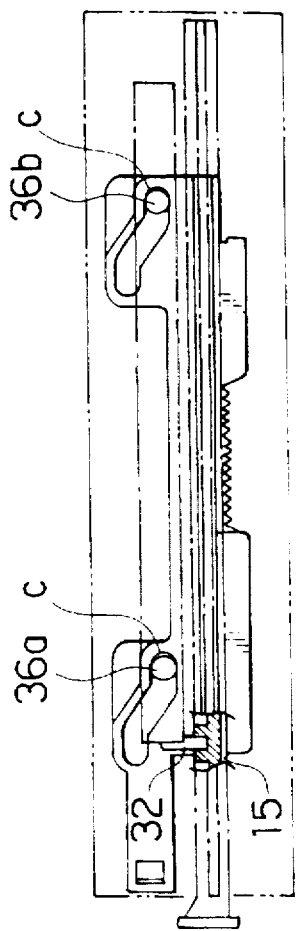
FIG. 17A
FIG. 17B
FIG. 17C

CLUTCH GEAR AND DISK REPRODUCING APPARATUS

This is a continuation of application Ser. No. 08/538,941, filed on Oct. 4, 1995, now abandoned.

BACKGROUND OF THE INVENTION

1. Field of the Invention

The present invention relates to a clutch gear for allowing one motor to drive two mechanical systems. In addition, the present invention relates to a disc reproducing apparatus such as a CD-ROM drive.

2. Description of the Related Art

In recent years, disc reproducing apparatuses such as CD-ROM drives that are built in computers have been powerfully developed. In a conventional disc reproducing apparatus, a tray that holds an optical disc is horizontally (in the direction of the disc surface) loaded and unloaded to and from a cabinet that has an optical pickup and a disc drive mechanism (including a disc motor and a turn table), and so forth. Another disc reproducing apparatus has a pickup unit that is integrally constructed of an optical pickup and a disc drive mechanism and that is lifted up while the tray is being loaded and unloaded.

In the disc reproducing apparatus that has the lift-up type pickup unit, when the pickup unit and the turn table are lifted up, the turn table causes the disc to be lifted up from the tray and then the disc is clamped between the turn table and a clamper (disposed at an upper position of the tray).

The method for allowing one motor to simultaneously drive a plurality of mechanisms is very effective for reducing the size and cost of the final product. Thus, in the disc reproducing apparatus, the method for allowing one motor to simultaneously drive the loading mechanism for the tray and the lifting mechanism for the pickup unit has been studied.

This method can be employed for an apparatus that transmits the motion of the motor to all the mechanical systems. However, when this method is used for an apparatus that continuously lifts up a pickup unit for a predetermined time period after the tray has been loaded, a clutch gear (having, for example, the following construction) should be used for a transmission system of the motion of the motor.

FIG. 22 is a sectional view showing the construction of the clutch gear. In the clutch gear, a felt pad 93 is disposed between two gears 91 and 92. The gear 91 is tensioned by a spring 94. By the tension of the spring 94, the gear 91 is linked to the other gear 92 through the felt pad 93. The gear 92 is secured to a shaft 96 of a motor 95. In addition, the gear 92 is engaged with a gear (not shown) of a lifting mechanism of the pickup unit. The gear 91 is engaged with a gear (not shown) of a loading mechanism. The lifting mechanism for the pickup unit and the loading mechanism for the tray are driven corresponding to the rotations of the gears 91 and 92 by the motion of the motor 95. When the tray is loaded, it comes in contact with a stopper. Thus, the tray is forcedly stopped at a predetermined position of the cabinet. Consequently, after the tray has been loaded, the rotation of the gear 91 is disabled. Thus, only the gear 92 is continuously rotated. Consequently, only the lifting operation of the pickup unit is continued. When the pickup unit is lifted up, the disc is held between the turn table and the clamper. Thus, the disc loading operation is completed.

However, the clutch gear has several problems.

In the clutch gear, the gears, the felt pad, and the spring are successively disposed in the vertical direction. Thus, it is difficult to thinly construct the clutch gear. Consequently, this clutch gear is not suitable for the disc reproducing apparatus that should be thinly constructed.

As the felt wears out, the linking force between the gears of the clutch gear gradually decreases. Thus, the motion of the loading mechanism of the tray is not satisfactorily transmitted and thereby the synchronization of each mechanism deviates.

In the clutch gear, after the tray is loaded, while only the gear 92 is rotated, the rotating load of the gear 92 increases. Thus, the motor requires a large torque corresponding to the increase of the load.

SUMMARY OF THE INVENTION

An object of the present invention is to provide a clutch gear that is thin and durably constructed of a small number of parts.

Another object of the present invention is to provide a disc reproducing apparatus that is thin and that allows a loading mechanism and a unit moving mechanism that have different completion timings to stably operate for a long time.

To accomplish the above-descried object, the present invention is a clutch gear for transmitting the motion of one motor to two mechanisms, comprising a first gear linked to a first mechanism, a second gear linked to a second mechanism, the second gear facing the first gear, the motion of the motor being transmitted to the second gear and then the first gear, and a first fitting member and a second fitting member formed on the first gear and the second gear in such a manner that the first fitting member and the second fitting member face the second gear and the first gear, respectively. The first fitting member and the second fitting member are adapted for fitting the first to the second gear, thereby simultaneously rotating the first gear and the second gear when the rotating load of the first gear is less than a predetermined value. At least one of the first fitting member and the second fitting member is elastically deformed so that the first gear and the second gear are released when the rotating load of the first gear exceeds the predetermined value.

According to the present invention, a clutch gear that is constructed of a small number of parts and that allows the motion of the motor to transmit two mechanisms that have two different completion timings can be accomplished. In addition, according to the clutch gear of the present invention, the height of the clutch gear can be reduced and the durability thereof can be improved in comparison with the conventional clutch gear. Moreover, according to the clutch gear of the present invention, after each damper is unclamped, since the second gear is rotated substantially out of contact with the first gear, the load of the motor can be reduced.

In addition, the present invention is a disc reproducing apparatus for allowing a disc to be unloaded and loaded from and to a tray that holds a disc, comprising a motor, a loading mechanism for loading the tray to the cabinet with the motion of the motor, a unit having a disc drive mechanism for driving the disc, a unit moving mechanism for moving the unit in a predetermined direction with the motion of the motor when the tray is loaded and for continuously moving the unit after the tray has been loaded, a first gear linked to the loading mechanism, a second gear linked to the unit moving mechanism, the second gear facing the first gear, the motion of the motor being transmitted to the second gear and then the first gear, and a first fitting member and a second fitting member formed on the first gear and the second gear in such a manner that the first fitting member and the second fitting member face the second gear and the first gear, respectively. The first fitting member and the second fitting member are adapted for fitting the first to the second gear, thereby simultaneously rotating the first gear and the second gear when the rotating load of the first gear is less than a predetermined value. At least one of the first fitting member and the second fitting member is elastically deformed so that the first gear and the second gear are released when the rotating load of the first gear exceeds the predetermined value.

According to the present invention, the disc reproducing apparatus is thin and that allows the loading mechanism and the unit moving mechanism to have different completion timings that stably operate for a long time.

These and other objects, features and advantages of the present invention will become more apparent in light of the following detailed description and as illustrated in the accompanying drawings.

BRIEF DESCRIPTION OF THE DRAWINGS

FIGS. 7A and 7B are a top view and a sectional view, respectively, showing a second gear of a clutch gear;

FIGS. 8A and 8B are a top view and a sectional view, respectively, showing a first gear of the clutch gear;

FIGS. 9A and 9B are a top view and a sectional view, respectively, showing the construction of the clutch gear;

FIGS. 13A and 13B are a top view and a sectional view, respectively, showing the construction of a centering member of the disc drive mechanism;

FIGS. 14A, 14B and 14C are a top view and a sectional view, respectively, showing the construction of a turn table of the disc drive mechanism;

FIG. 16 is a perspective view showing a tray loading operation;

FIGS. 17A to 17C are plan views showing the state that the tray is unloaded;

DESCRIPTION OF THE PREFERRED EMBODIMENTS

Next, with reference to the accompanying drawings, an embodiment of the present invention will be described.

Figure 1:
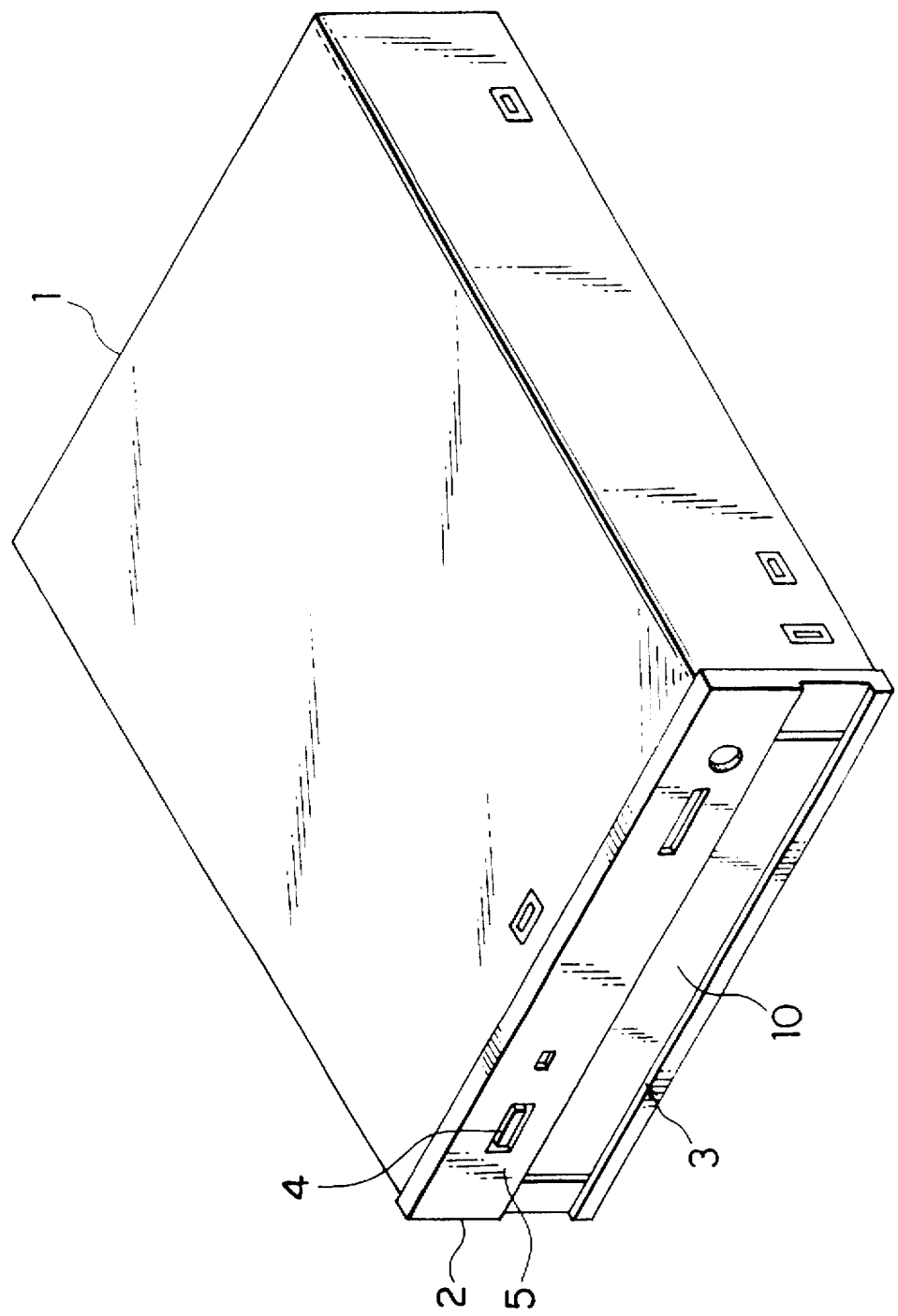
FIG. 1 is a perspective view showing an optical disc reproducing apparatus according to an embodiment of the present invention.

In FIG. 1, reference numeral 1 is a cabinet. Reference numeral 2 is a front panel. The front panel 2 has an opening portion 3, an eject switch 4, and a small hole 5. A tray 10 that holds an optical disc is loaded and unloaded to and from the opening portion 3. The eject switch 4 issues an electric command for unloading the tray 10. In case of a trouble of the tray 10, when a needle or the like is inserted into the small hole 5, the tray can be manually unloaded.

Figure 2:
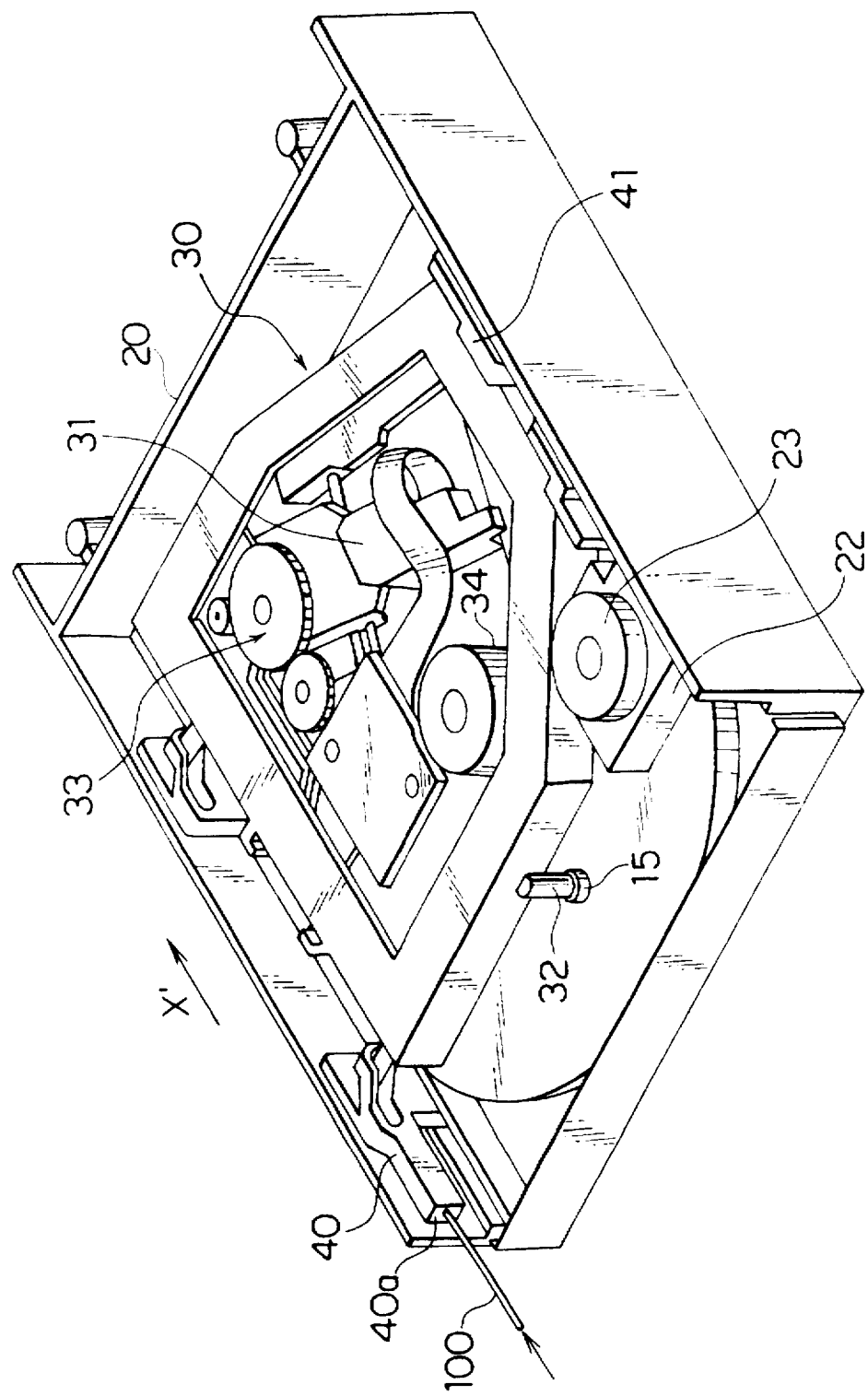
FIG. 2 is a perspective bottom view showing the inside of the optical disc reproducing apparatus shown in FIG. 1 of which a cabinet is removed.
Figure 3:
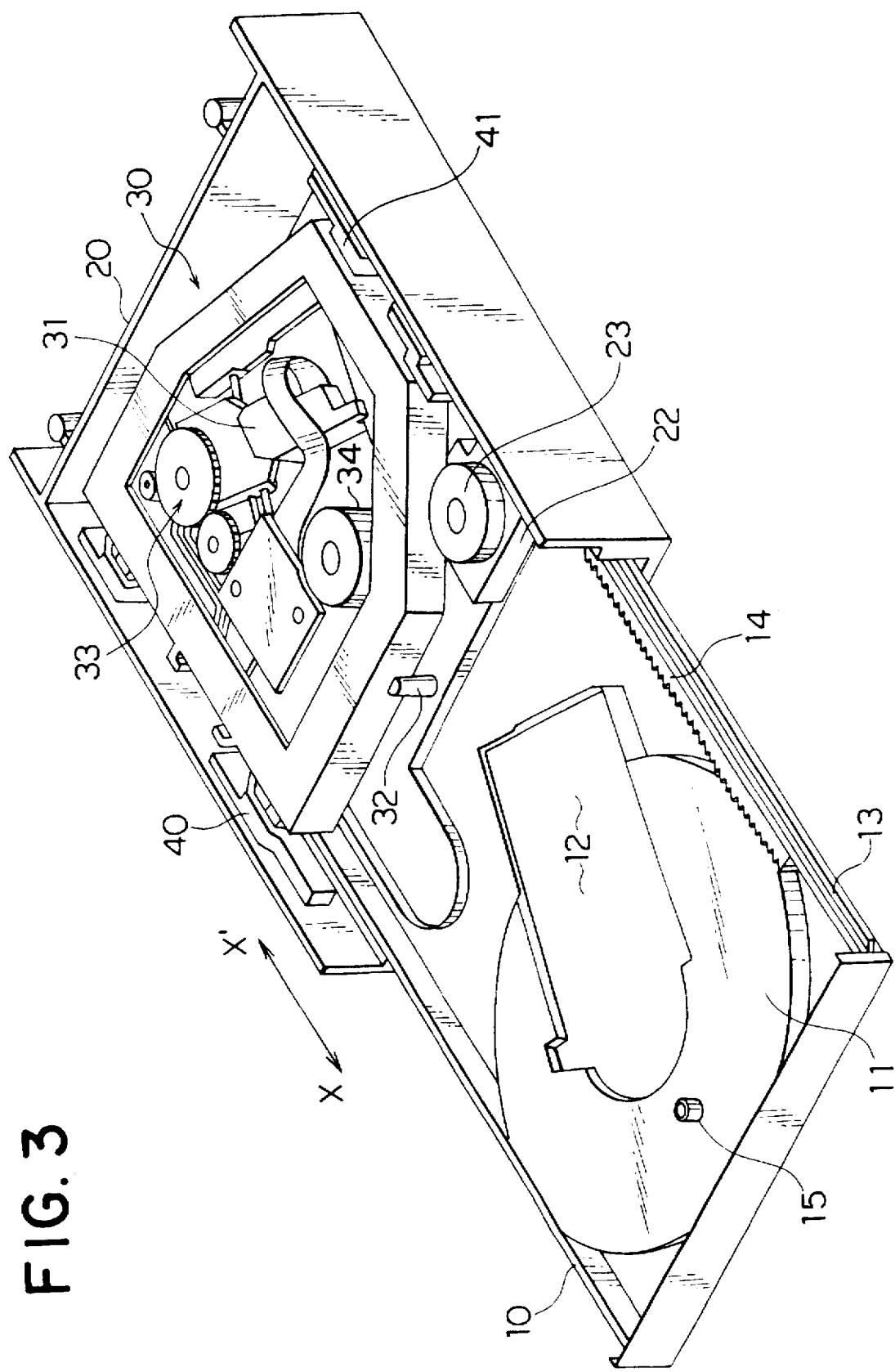
FIG. 3 is a perspective top view showing the optical disc reproducing apparatus of which the tray has been unloaded.
Figure 4:
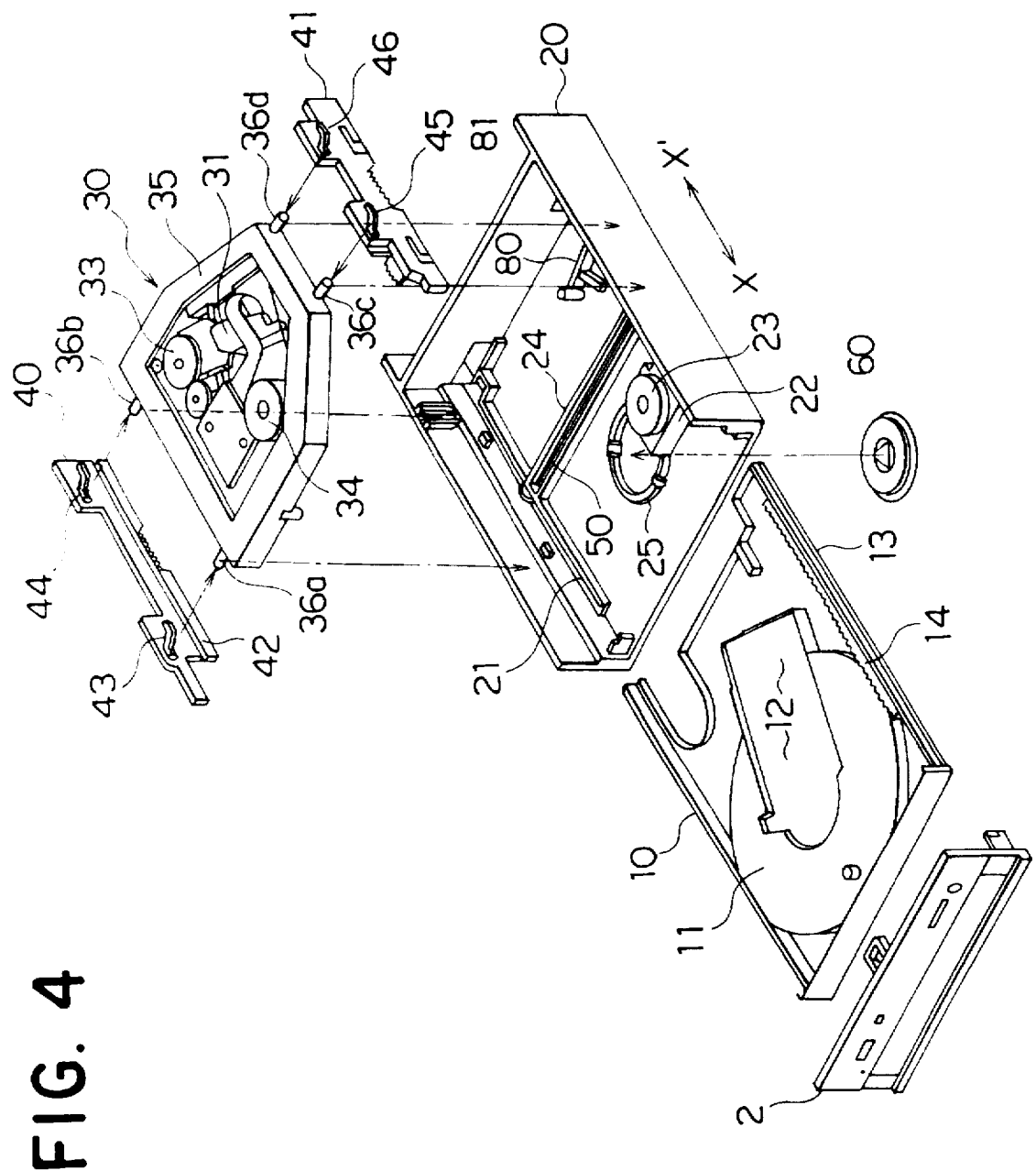
FIG. 4 is an exploded perspective top view showing the optical disc reproducing apparatus shown in FIG. 1.

In FIGS. 2, 3, and 4, reference numeral 20 is a frame composed of a mold resin. Reference numeral 30 is a pickup unit (hereinafter referred to as the PU unit). Reference numerals 40 and 41 are a pair of sliders that support and guide the tray 10 and the PU unit 30 in the frame 20.

Next, each portion of the apparatus will be described in detail.

(Detail description of frame 20)

The frame 20 comprises slider support portions 21 (that slidably support the sliders 40 and 41 in the direction of the arrow X-X'), a motor mount portion 22 (that mounts a motor 23 that is a power source for loading and unloading the tray 10), a joint member mount portion 24 (that mounts a joint member 50 (see FIG. 6) for synchronizing the sliding motions of the sliders 40 and 41), and a clamper mount portion 25 (that rotatably supports a clamper 60).

(Detail description of tray 10)

The tray 10 has a disc hold portion 11 and a window 12. The disc hold portion 11 holds an optical disc (not shown). A part of a signal record surface of the optical disc held on the disc hold portion 11 is exposed via the window 12. Slider fitting protrusions 13 are formed on the outer side surfaces of the tray 10. The slider fitting protrusions 13 fit within guide grooves 42 (see FIG. 5) of the sliders 40 and 41, respectively. Thus, the tray 10 is supported on the sliders 40 and 41 so that the tray 10 is movable in the direction of the arrow X-X'. A rack gear 14 is formed on one inner side surface of the tray 10. The rack gear 14 is linked to the loading motor 23 through a plurality of gears. An aligning pin hole 15 is formed on the rear surface of the disc hold portion 11 of the tray 10. When a fixing pin 32 formed on the PU unit 30 is inserted into the pin hole 15, the tray 10 is aligned and secured to the PU unit 30.

(Detail description of PU unit 30)

The PU unit 30 comprises an optical pickup 31, a pickup moving mechanism 33, a disc drive mechanism, a frame 35, and a print wiring board. The optical pickup 31 reads an information signal from the signal record surface of the optical disc. The pickup moving mechanism 33 moves the optical pickup in the radial direction of the optical disc. The disc drive mechanism comprises a turn table and a disc motor 34 that hold and rotate the optical disc along with the clamper 60. The frame 35 integrally supports the optical pickup 31, the pickup moving mechanism 33, and the disc drive mechanism. The above-described fixing pin 32 is formed on the frame 35. Guide pins 36a, 36b, 36c, and 36d that are inserted into guide holes 43, 44, 45, and 46 formed in the sliders 40 and 41 (see FIG. 5) are formed on both the side surfaces of the frame 35.

(Detail description of sliders 40 and 41)

Figure 5:
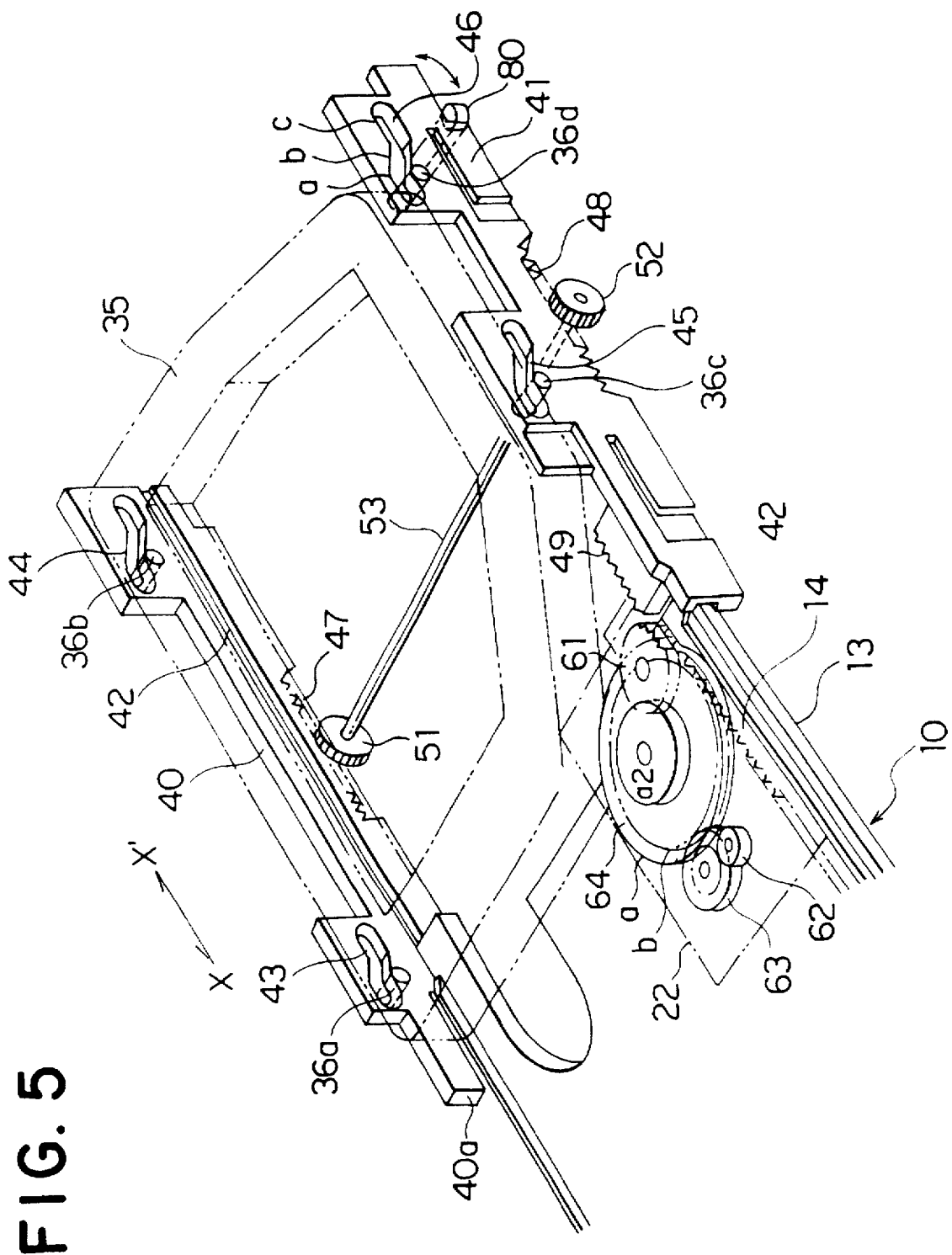
FIG. 5 is a perspective top view showing the linking relation among sliders, a tray, and a PU unit.

As shown in FIG. 5, the sliders 40 and 41 have guide grooves 42 and guide holes 43, 44, 45, and 46. The guide grooves 42 fit the slider fitting protrusions 13 formed on the outer side surfaces of the tray 10 so as to slidably guide the tray 10 in the direction of the arrow X-X'.

Guide pins 36a and 36b and guide pins 36c, and 36d formed on the frame 35 of the PU unit 30 are inserted into the guide holes 43 and 44 and the guide holes 45 and 46, respectively. Since the guide holes fit the corresponding guide pins, the PU unit 30 is lifted up or down along with the sliding operations of the sliders 40 and 41.

Figure 6:
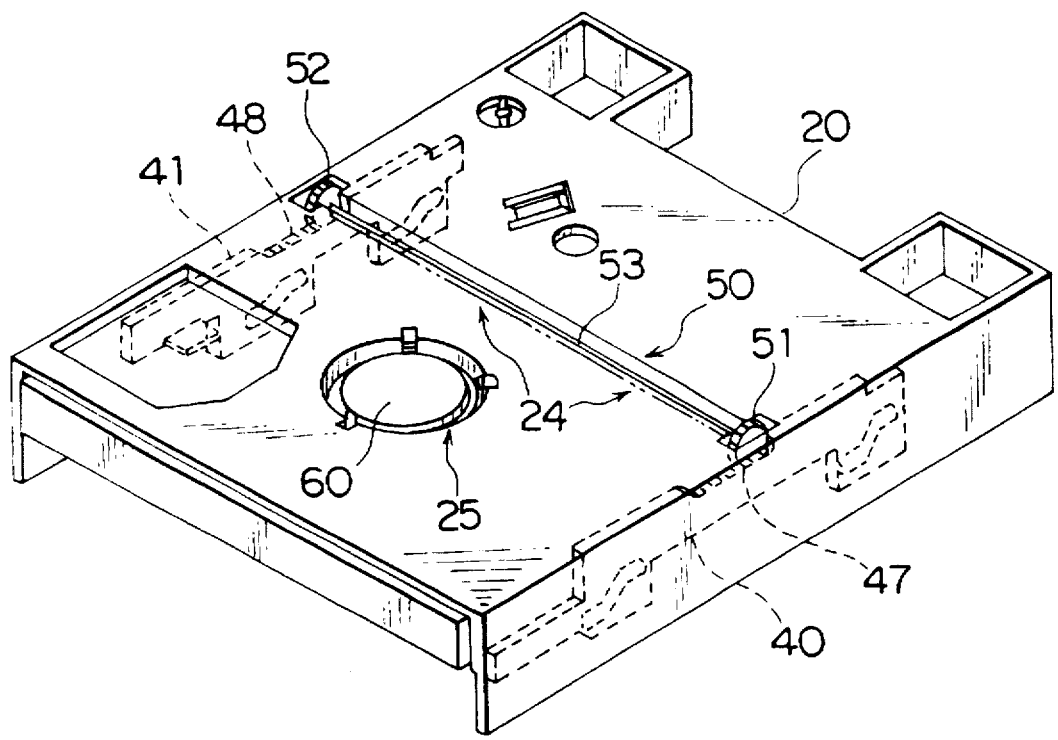
FIG. 6 is a perspective top view showing the optical disc reproducing apparatus shown in FIG. 2.

Rack gears 47 and 48 are formed at the lower edges of the sliders 40 and 41, respectively. As shown in FIG. 6, the rack gears 47 and 48 are engaged with gears 51 and 52 secured at both edges of a shaft 53 of a link member 50. The sliders 40 and 41 are linked by the link member 50 so that the sliders 40 and 41 are synchronously slid. A rack gear 49 is formed on the slider 41.

(Detail description of motion transmission system of loading motor 23)

As shown in FIG. 5, the motor 23 is secured to the motor mount table 22 (see FIGS. 3 and 4) of the frame 20. A motor gear 62 axially secured to the motor shaft of the motor 23 is linked to a clutch gear 64 through an intermediate gear 63.

As shown in FIGS. 7A-7B, 8A-8B, and 9A-9B, the clutch gear 64 is constructed of a second gear a and a first gear b. The second gear a receives the motion of the motor 23 through the gears 63 and 62 (see FIG. 5). A protrusion a1 is formed on the second gear a in such a manner that the protrusion a1 faces the first gear b. The protrusion a1 is equivalent to a first fitting member or a second fitting member. A gear a2 that is coaxial to the second gear a is disposed on the other surface of the second gear a. The gear a2 can be linked with the rack gear 49 of the slider 41 through the gear 61.

The first gear b is engaged with the rack gear 14 of the tray 10. A protrusion holder b1 that holds the protrusion a1 of the second gear a is formed in the first gear b. The protrusion holder b1 is formed at the hatched position of FIG. 8A. The protrusion holder b1 is equivalent to the first fitting member or the second fitting member. The protrusion holder b1 is formed in an elongated shape extending along the rotating direction of the gear. The protrusion holder b1 is supported by the first gear b through one edge portion in the longitudinal direction thereof. When the rotating load of the first gear b exceeds a predetermined value, the protrusion holder b1 is elastically deformed by the pressure from the protrusion a1.

Next, the operation of the clutch gear 64 will be described.

Figure 10A:
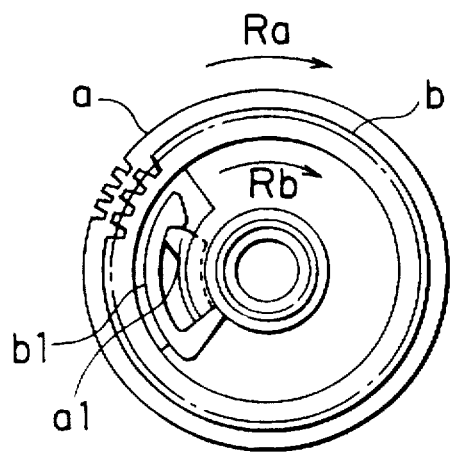
FIGS. 10A to 10C are top views for explaining the operation of the clutch gear.

As shown in FIG. 10A, when the tray 10 is loaded, the second gear a is rotated in the direction of the arrow Ra by the motion of the motor 23. At this point, since the rotating load of the first gear b is only the loading load of the tray 10, the protrusion holder b1 of the first gear b is not elastically deformed. Thus, in this case, since the protrusion holder b1 of the first gear b holds (fits) the protrusion a1 of the second gear a, the first gear b rotates in the same direction (the direction of the arrow Rb) and at the same speed as the second gear a.

When the tray is unloaded, the second gear a is rotated in the reverse direction of the arrow Ra by the motion of the motor 23. In this case, the protrusion a1 is completely fitted to the protrusion holder b1. Thus, the first gear b is rotated in the same direction (in the reverse direction of the arrow Rb) and at the same speed as the second gear a.

Figure 10B:
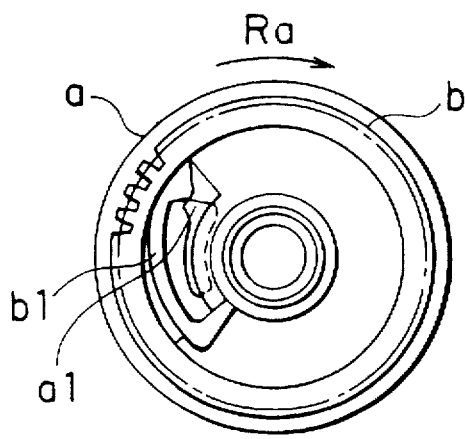

FIG. 10B shows the state of the clutch gear 64 that the tray 10 has just been loaded (moved in the horizontal direction). As described above, the PU unit 30 is continuously lifted up or down after the tray has been loaded. Thus, after the tray has been loaded, the second gear a is rotated in the direction of the arrow Ra by the motion of the motor 23.

On the other hand, the rotation of the first gear b that is engaged with the rack gear 14 of the tray 10 is restricted when the tray 10 has been loaded. Thus, the protrusion holder b1 is elastically deformed by the pressure of the protrusion a1. Consequently, the protrusion a1 is released from the protrusion holder b1. Thereafter, only the second gear a is rotated in the direction of the arrow Ra. The rotation of the second gear a is transmitted to the lifting mechanism of the PU unit through the rack gear 49. Thus, only the lifting operation of the PU unit 30 is continued so that the disc is clamped.

Figure 10C:
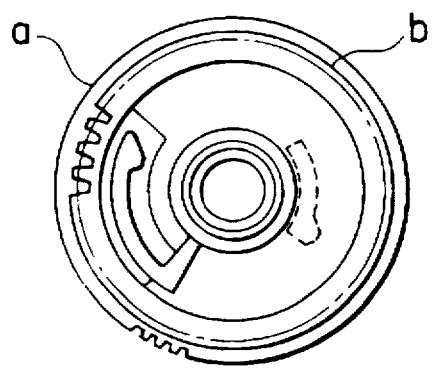

FIG. 10C is a view showing the state of the clutch gear 64 that the PU unit 30 has been lifted. Until this state, only the second gear a is rotated.

(Detail description of disc clamp mechanism)

Figure 11:
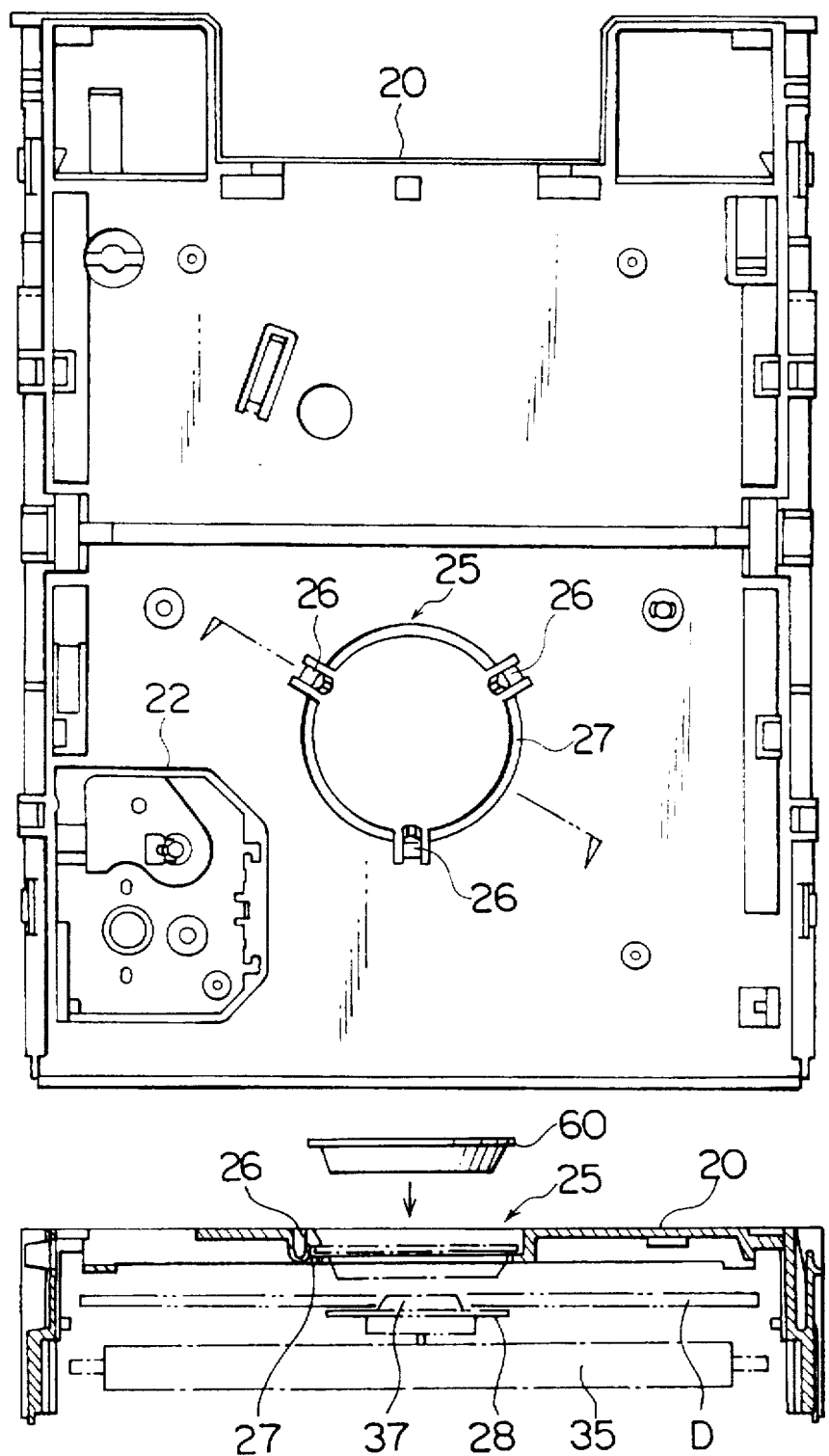
FIGS. 11A and 11B are a top view and a sectional view, respectively, showing the construction of a disc clamp mechanism.

As shown in FIGS. 11A-11B, the clamper mount portion 25 comprises an opening portion and three nail portions 26. The clamper 60 fits the opening portion. The three nail portions 26, hold the clamper 60, which fits the opening portion. The clamper 60 is rotatably held between the three nail portions 26, and a base 27. Each of the nail portions 26 is constructed of a tapered edge portion and a damper support surface. The edge portion is elastically deformed by the clamper 60 when it is mounted. The clamper support surface holds the clamper 60 so as to prevent it from dropping. The clamper 60 has a magnet (not shown) that magnetically links to a metal buried in the turn table 28.

(Detail description of disc drive mechanism)

Figure 12:
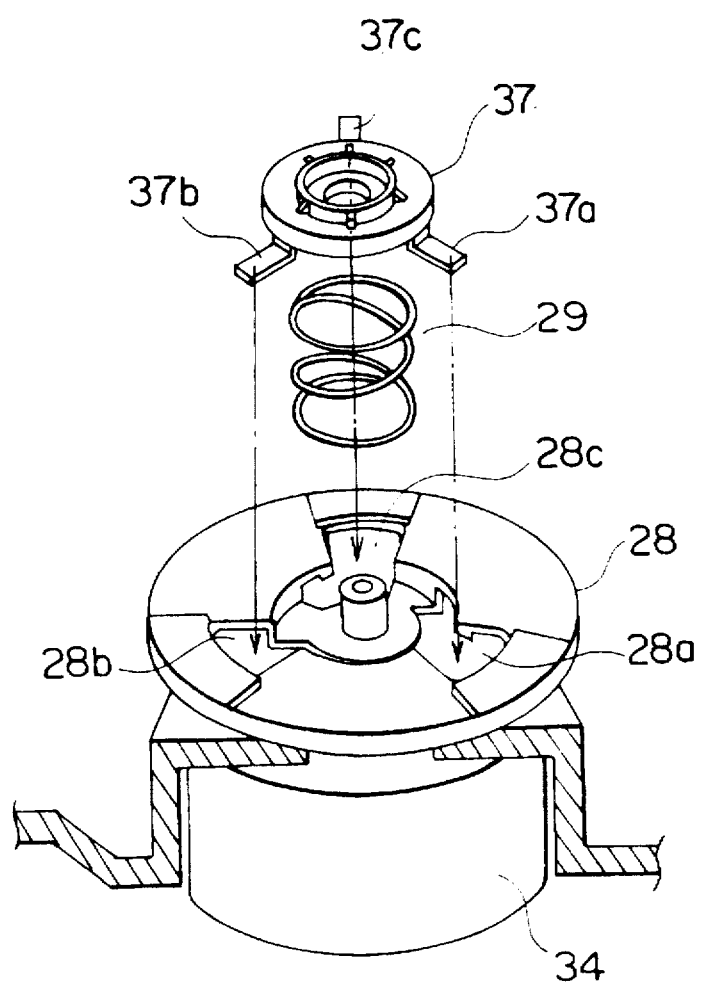
FIG. 12 is an exploded perspective view showing the construction of the disc drive mechanism.

As shown in FIG. 12, the disc drive mechanism comprises the turn table 28, the disc motor 34, and a centering member 37. The disc motor 34 drives the turn table 28. The centering member 37 is disposed on the turn table 28 through a spring 29. The centering member 37 aligns the optical disc D at the center of the turn table 28.

As shown in FIGS. 13A and 13B, the centering member 37 has three protrusion plates 37a, 37b, and 37c that have the same shape.

The protrusion plates 37a, 37b, and 37c are disposed around the centering member 37 at equal intervals. The protrusion plates 37a, 37b, and 37c radially protrude from the center of the periphery of the centering member 37 (in the direction along the surface of the optical disc).

As shown in FIGS. 14A-14C, the turn table 28 has three insertion holes 28a, 28b, and 28c, hold portions 28d, 28e, and 28f, and stoppers S1, S2, and S3. The protrusion plates 37a, 37b, and 37c of the centering member 37 are inserted into the insertion holes 28a, 28b, and 28c, respectively. The hold portions 28d, 28e, and 28f hold the protrusion plates 37a, 37b, and 37c at predetermined positions of the turn table 28.

Figure 15A:
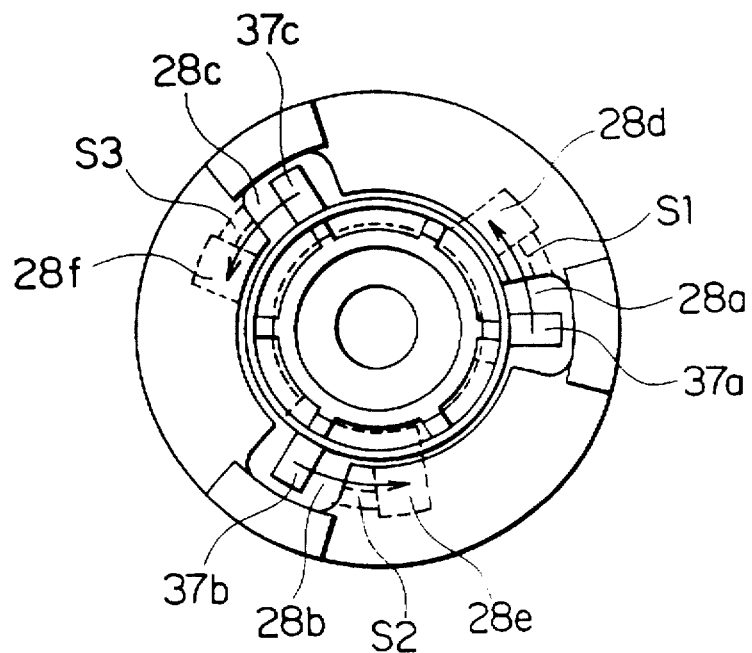
FIGS. 15A and 15B are views for explaining the method for mounting the centering member to the turn table.
Figure 15B:
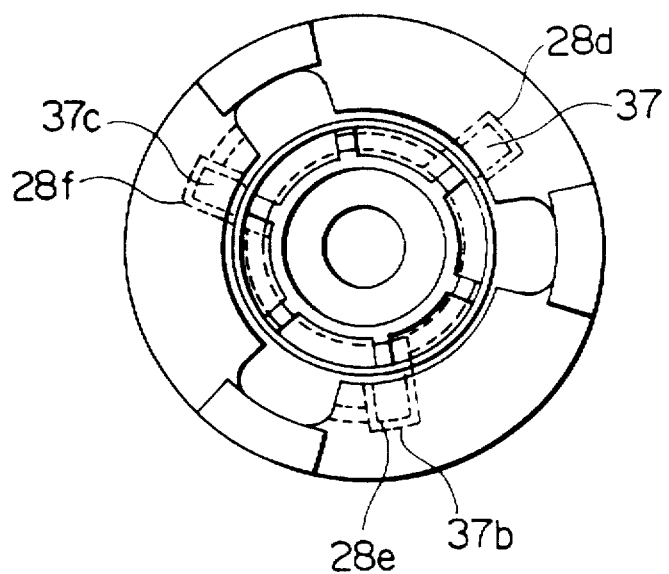

When the centering member 37 is mounted on the turn table 28, as shown in FIG. 15A, the protrusion plates 37a, 37b, and 37c of the centering member 37 are downwardly inserted into the insertion holes 28a, 28b, and 28c of the turn table 28. At this point, the protrusion plates 37a, 37b, and 37c should be inserted into the insertion holes 28a, 28b, and 28c so that the protrusion plates 37a, 37b, and 37c are placed to positions lower than the lower edge surfaces of the stoppers S1, S2, and S3, respectively. Next, as shown in FIG. 15B, the centering member 37 is manually rotated in the direction of the arrow. Thus, the protrusion plates 37a, 37b, and 37c are moved to the positions of the hold portions 28d, 28e, and 28f, respectively. Thereafter, when the centering member 37 is released, it is raised by the tension of the spring 29. Thus, the protrusion plates 37a, 37b, and 37c of the centering member 37 fit the hold portions 28d, 28e, and 28f of the turn table 28, respectively. In this state, the rotations and the movements of the protrusion plates 37a, 37b, and 37c of the centering member 37 to the positions of the insertion holes 28a, 28b, and 28c are restricted by the stoppers S1, S2, and S3, respectively. Thus, the centering member 37 is mounted to the turn table 28.

(Detail description of synchronous check structure of sliders 40 and 41)

Next, with reference to FIGS. 6 and 16, a synchronous check structure of the sliders 40 and 41 of the disc reproducing apparatus will be described. As described above, the sliders 40 and 41 are linked through the link member 50. Thus, the slide operations of the sliders 40 and 41 are synchronized. In this structure, when the sliders 40 and 41 are linked through the link member 50, the sliders 40 and 41 should be disposed at horizontally symmetrical positions.

To cause the sliders 40 and 41 to be easily lined through the link member 50, the optical disc reproducing apparatus has holes 40b and 41a (that are formed at horizontally symmetrical positions of the sliders 40 and 41) and check windows 20d and 20d (formed on both walls 201 and 202 of the frame 20). The check windows 20a and 20a are formed so that they match the holes 40b and 41b of the sliders 40 and 41 when they are placed at their normal positions. Thus, when the link member 50 is mounted in such a manner that the holes 40b and 41b of the sliders 40 and 41 are aligned to the positions of the check windows of the frame 20, the assembling work can be precisely performed.

(Detail description of tray loading operation)

Next, the loading operation for the tray 10 and the lifting operation for the PU unit 30 will be described.

Figure 18:
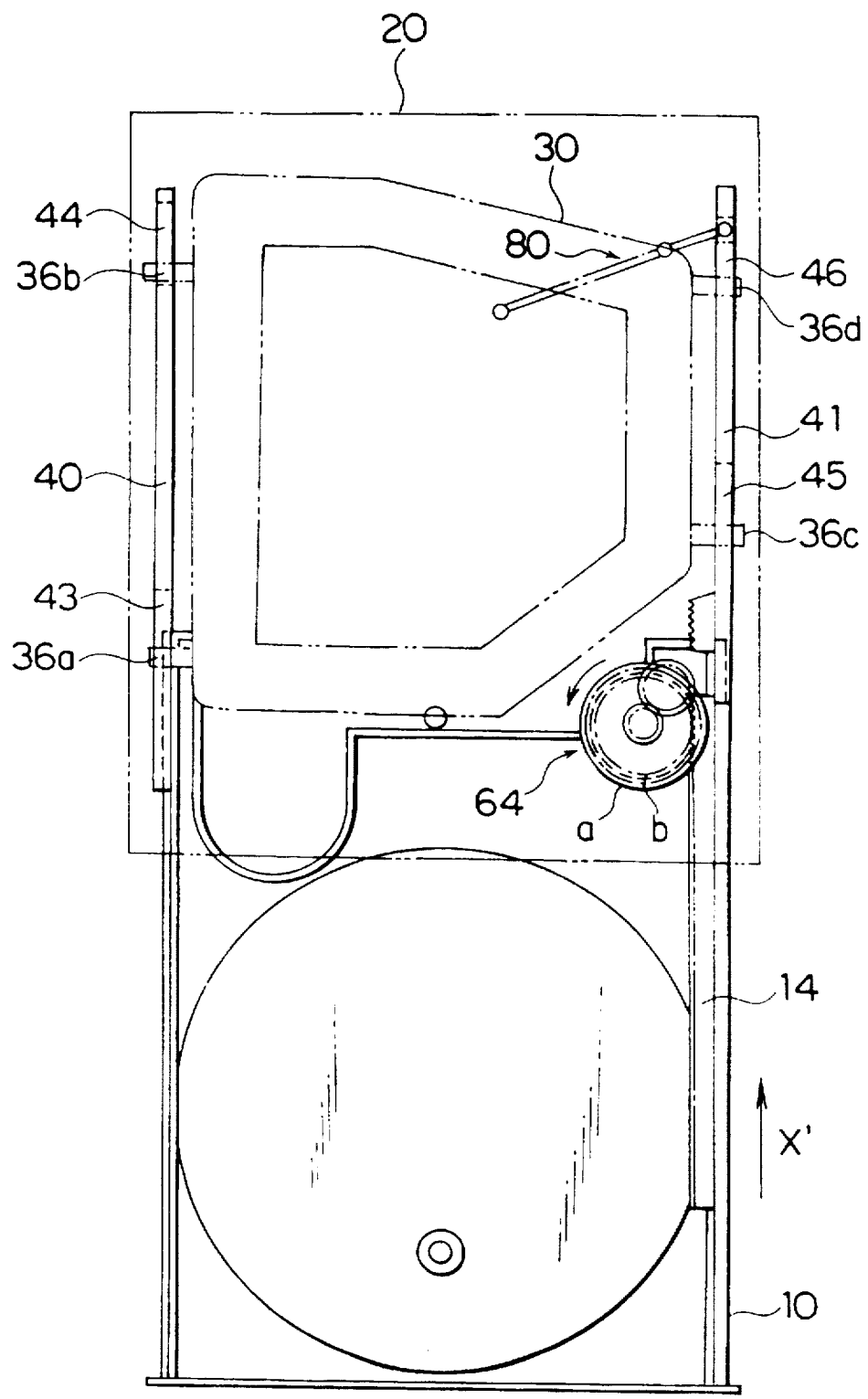
FIG. 18 is a plan view showing the state that the tray is being loaded.

FIGS. 17A and 18 show the state that the tray 10 has been unloaded. As shown in FIGS. 17A and 18, when the tray 10 has been unloaded, the guide pins 36a, 36b, 36c, and 36d of the PU unit are placed at upper horizontal portions a of the guide holes 43, 44, 45, and 46 on the sliders 40 and 41. At this point, the turn table 28 is separated from the clamper 60. On the other hand, as shown in FIG. 18, the rack gear 14 on the tray 10 is linked to the first gear b of the clutch gear 64.

When the tray 10 is manually pushed in the direction of the arrow X', the tray 10 is loaded. When the tray 10 is moved for a predetermined distance, the movement of the tray 10 is electrically detected by a switch 70 disposed on the frame 20. The resultant signal is sent to a controller. Thus, the controller causes the loading motor 23 to start. When the motor 23 starts, the clutch gear 64 rotates in the direction of the arrow. Thus, the tray 10 is automatically loaded.

Figure 19:
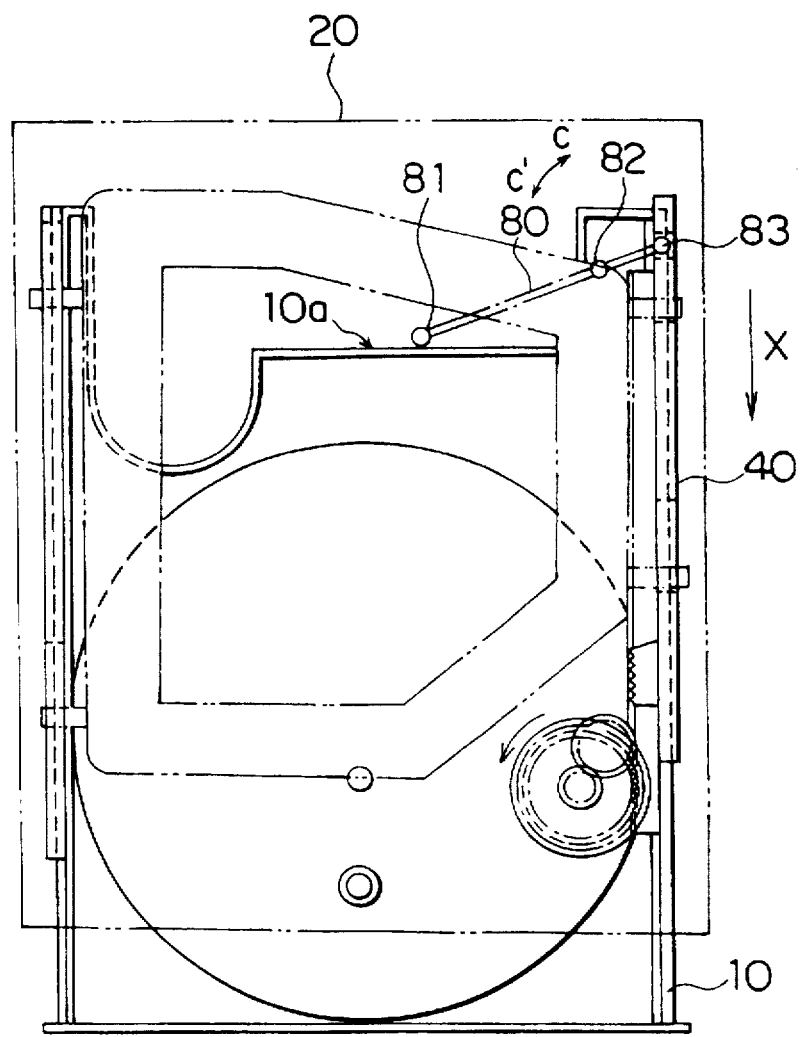
FIG. 19 is a plan view showing the state that the tray has been loaded.

When the loading amount of the tray 10 exceeds a predetermined distance, as shown in FIG. 19, an edge surface 10a on the insertion side of the tray 10 comes in contact with an edge portion 81 of a rotating lever 80. As shown in FIGS. 4 and 5, the rotating lever 80 is rotatably supported on the frame through a shaft 82. The rotating lever 80 has another edge portion 83 that causes the slider 40 to be pushed on the front surface side (in the direction of the arrow X). Thus, the edge portion 81 of the rotating lever 80 comes in contact with the edge surface 10a on the insertion side of the tray 10 and thereby the rotating lever 80 rotates in the direction of the arrow C. Consequently, the slider 40 slides to the front surface side (in the direction of the arrow X). When the slider 40 moves, the other slider 41 linked to the slider 40 through the link member 50 slides in the direction of the arrow X in synchronization with the slider 40.

Figure 20:
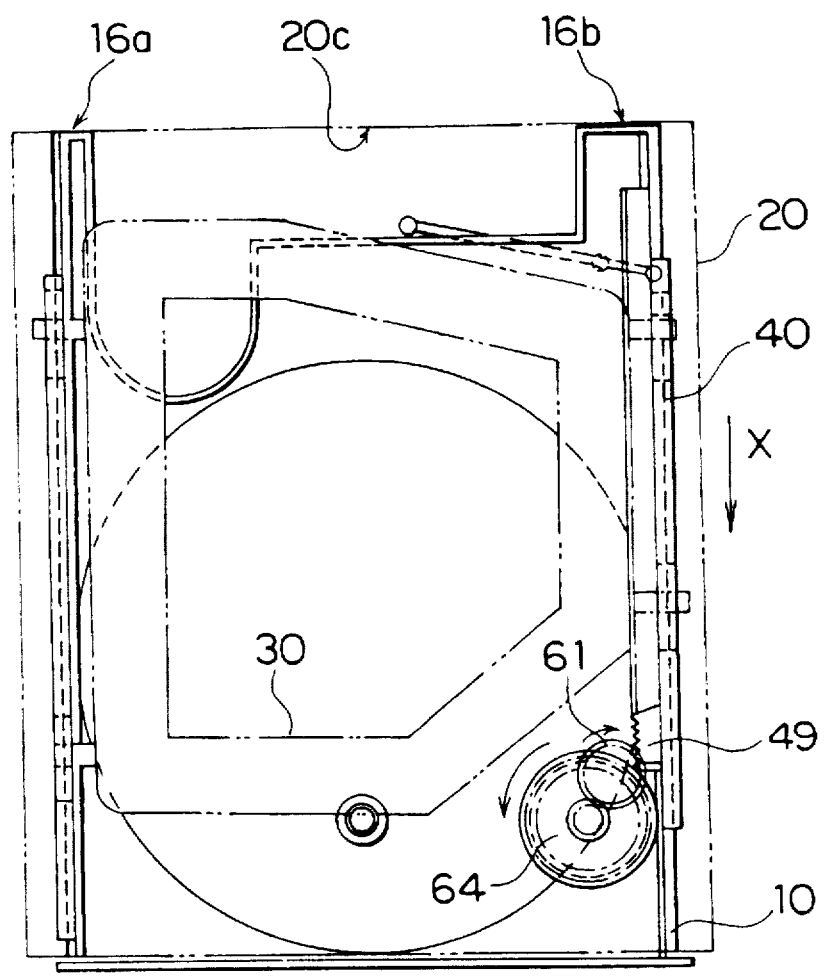
FIG. 20 is a plan view showing the state that the disc has been loaded and clamped.

As shown in FIG. 20, when the edge surfaces 16a and 16b of the tray 10 come in contact with a surface 20c of the frame 20, the loading operation of the tray 10 is completed. At this point, as shown in FIG. 17B, the guide pins 36a, 36b, 36c, and 36d of the PU unit 30 are placed at slope portions b of the guide holes 43, 44, 45, and 46 of the sliders 40 and 41. In other words, the PU unit 30 is placed almost in the middle of the lifting range.

At this point, as shown in FIG. 20, the rack gear 49 of the slider 40 has been linked to the gear 61. Thus, the sliders 40 and 41 are moved in the direction of the arrow X by the motion of the loading motor 23 through the clutch gear 64, the gear 61, and the rack gear 49. At this point, as described above, the motion of the motor 23 to the tray loading mechanism is disconnected by the clutch 64. Thus, the motion is transmitted to only the lifting mechanisms of the sliders 40 and 41.

Figure 21:
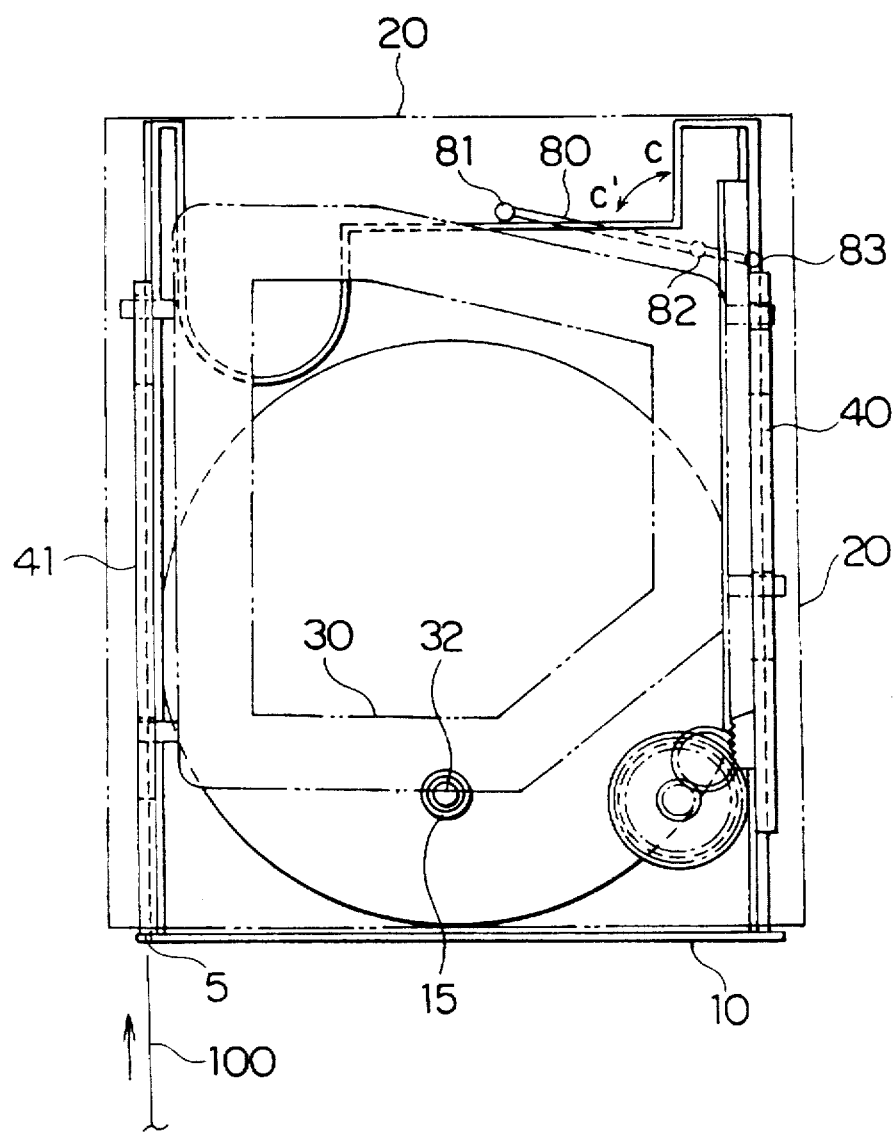
FIG. 21 is a plan view for explaining a synchronous check structure of each slider.
Figure 22:
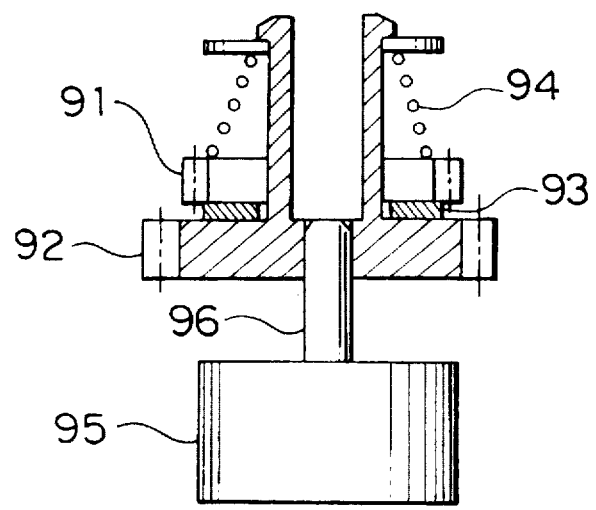
FIG. 22 is a sectional view showing the construction of a conventional clutch gear.

FIG. 21 is a plan view showing the state that the sliders 40 and 41 have been moved (namely, the disc has been loaded). At this point, as shown in FIG. 17C, the guide pins 36a, 36b, 36c, and 36d of the PU unit 30 are placed at lower horizontal portions c of the guide holes 43, 44, 45, and 46 of the sliders 40 and 41, respectively. At this point, the optical disc is clamped between the turn table 28 and the clamper 60. The fixing pin 32 on the PU unit 30 fits the pin hole 15 of the tray 10. Thus, the tray 10 and the PU unit 30 are horizontally and vertically aligned and secured.

When the eject switch 4 is pressed, the tray 10 is unloaded. When the controller receives an eject detection signal of the eject switch 4, it causes the loading motor 23 to rotated in the reverse direction of the loading operation. Thus, the PU unit 30 is moved from a position (height) shown in FIG. 17C to a position (height) shown in FIG. 17B and thereby the disc is unclamped. Thereafter, the tray 10 is unloaded in the reverse operation of the above-described loading operation. When the tray 10 has been unloaded to a predetermined position, the switch on the frame 20 electrically detects that the tray 10 has been unloaded. When the controller 70 receives the detection signal from the switch 70, it causes the motor 23 to stop.

Next, a forced unloading operation for forcedly unloading the tray 10 from the cabinet 1 in case of a trouble of the loading mechanism including the loading motor 23 will be described.

As shown in FIG. 1, a hole 5 into which a needle or the like is inserted is formed in the front panel 2. As shown in FIG. 2, a needle 100 inserted into the hole 5 comes in contact with an edge surface 40a of the slider 40. When the needle 100 is strongly pushed, the sliders 40 and 41 slide in the direction of the arrow X'. Thus, the PU unit 30 is lifted up. Thus, when the slider 41 is moved in the direction of the arrow X', as shown in FIG. 21, the rotating lever 80 is rotated in the direction of the arrow C'. Thus, the tray 10 is pushed to the front surface side of the apparatus. At this point, since the fixing pin 32 of the PU unit 30 is separated from the pin hole 15 of the tray 10, it can be manually pulled out.

As described above, since the optical disc reproducing apparatus has the clutch gear 64 shown in FIGS. 7A-7B, 8A-8B and 9A-9B, the PU unit 30 is continuously lifted after the tray 10 has been loaded. When the rotating load of the first gear b exceeds a predetermined value (namely, when the tray 10 has been loaded), the protrusion holder b1 of the first gear b is elastically deformed by the pressure of the protrusion a1 of the second gear a. Thus, the protrusion holder b1 is released from the protrusion a1. The construction of the clutch gear 64 according to the preset invention is simpler than that of the conventional clutch gear. The height of the clutch gear 64 according to the present invention is smaller than that of the conventional clutch gear. In addition, after the protrusion a1 is released from the protrusion holder b1, since the first gear b of the second gear a is rotated substantially out of contact with the first gear b, the load of the motor 23 is small. Consequently, the motor used in the optical disc reproducing apparatus can be miniaturized. Thus, according to the present invention, the apparatus can be fabricated in a small and thin construction at a low cost.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A disc reproducing apparatus for allowing a disc to be unloaded and loaded from and to a tray that holds said disc, comprising:

a motor;

a loading mechanism for loading the tray to a cabinet with a motion of said motor;

a unit having a disc drive mechanism for driving the disc;

a unit moving mechanism for moving said unit in a predetermined direction with said motion of said motor responsive to said tray being loaded and for continuously moving said unit after said tray has been loaded;

a first gear linked to said loading mechanism;

a second gear linked to said unit moving mechanism, said second gear facing said first gear, said motion of said motor being transmitted to said second gear and then said first gear; and a first fitting member and a second fitting member disposed on said first gear and said second gear in a manner such that said first fitting member and said second fitting member face said second gear and said first gear, respectively, wherein said first fitting member and said second fitting member are adapted for coupling said first gear and said second gear to simultaneously rotate said first gear and said second gear if a rotating load of said first gear is less than a predetermined value, and wherein at least one of said first fitting member and said second fitting member are elastically deformed so that said first gear and said second gear are decoupled responsive to said rotating load of said first gear exceeding said predetermined value.

2. The disc reproducing apparatus as set forth in claim 1, wherein said rotating load of said first gear is less than said predetermined value if said tray is loaded, and wherein said rotating load of said first gear exceeds said predetermined value if said tray has just been loaded.

3. The disc reproducing apparatus as set forth in claim 1, wherein said first gear and said second gear are rotatably supported by a common shaft.

4. The disc reproducing apparatus as set forth in claim 1, wherein said unit comprises:

an optical pickup for reading an information signal from the disc; and a pickup moving mechanism for moving said optical pickup in a radial direction of the disc.

5. The disc reproducing apparatus as set forth in claim 1, wherein said unit moving mechanism is adapted for moving said unit in a direction of a thickness of the disc held on the tray.

6. A disc reproducing apparatus for allowing a disc to be unloaded and loaded from and to a tray that holds said disc, comprising:

a motor;

a loading mechanism for loading said tray to a cabinet with a motion of said motor;

a unit having a disc drive mechanism for driving said disc;

a unit moving mechanism for moving said unit after said tray is loaded;

a first gear linked to said loading mechanism;

a second gear linked to said unit moving mechanism, said second gear facing said first gear, said motion of said motor being transmitted to said second gear and then said first gear; and a first fitting member and a second fitting member disposed on said first gear and said second gear in a manner such that said first fitting member and said second fitting member face said second gear and said first gear, respectively, wherein said first fitting member and said second fitting member are adapted for coupling said first gear and said second gear to simultaneously rotate said first gear and said second gear if a rotating load of said first gear is less than a predetermined value, and wherein at least one of said first fitting member and said second fitting member are elastically deformed so that said first gear and said second gear are decoupled if said rotating load of said first gear exceeds said predetermined value.

7. A disc reproducing apparatus for allowing a disc to be unloaded and loaded from and to a tray that holds said disc, comprising:

a motor;

a loading mechanism for loading said tray to a cabinet with a motion of said motor;

a unit having a disc drive mechanism for driving said disc;

a unit moving mechanism for moving said unit in a predetermined direction with said motion of said motor responsive to said tray being loaded and for continuously moving said unit after said tray has been loaded;

a first gear interlocked to said loading mechanism;

a second gear interlocked to said unit moving mechanism, said second gear facing said first gear, said motion of said motor being transmitted to said second gear and then said first gear; and a first fitting member and a second fitting member disposed on said first gear and said second gear in a manner such that said first fitting member and said second fitting member face said second gear and said first gear, respectively, wherein said first fitting member and said second fitting member are adapted for coupling said first gear and said second gear to simultaneously rotate said first gear and said second gear if a rotating load of said first gear is less than a predetermined value, and wherein at least one of said first fitting member and said second fitting member are elastically deformed so that said first gear and said second gear are decoupled if said rotating load of said first gear exceeds said predetermined value.

8. A disc reproducing apparatus for allowing a disc to be unloaded and loaded from and to a tray that holds said disc, comprising:

a motor;

a loading mechanism for loading said tray to a cabinet with a motion for said motor;

a unit having a disc drive mechanism for driving said disc;

a unit moving mechanism for moving said unit after said tray is loaded;

a first gear interlocked to said loading mechanism;

a second gear interlocked to said unit moving mechansim, said second gear facing said first gear, said motion of said motor being transmitted to said second gear and then said first gear; and a first fitting member and a second fitting member disposed on said first gear and said second gear in a manner such that said first fitting member and said second fitting member face said second gear and said first gear, respectively, wherein said first fitting member and said second fitting member are adapted for coupling said first gear and said second gear to simultaneously rotate said first gear and said second gear if a rotating load of said first gear is less than a predetermined value, and wherein at least one of said first fitting member and said second fitting member are elastically deformed so that said first gear and said second gear are decoupled if said rotating load of said first gear exceeds said predetermined value.

* * * * *